United States Patent
Shin et al.

(10) Patent No.: US 9,497,574 B2
(45) Date of Patent: Nov. 15, 2016

(54) SYSTEM AND METHOD FOR TRANSMITTING DATA BASED ON BLUETOOTH, AND APPARATUS APPLIED TO THE SAME

(71) Applicant: SK PLANET CO., LTD., Gyeonggi-Do (KR)

(72) Inventors: Chul Yong Shin, Seoul (KR); Jae Hyung Huh, Gyeonggi-Do (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/639,404

(22) Filed: Mar. 5, 2015

(65) Prior Publication Data

US 2015/0256471 A1    Sep. 10, 2015

(30) Foreign Application Priority Data

Mar. 7, 2014    (KR) .................. 10-2014-0027138

(51) Int. Cl.
*H04B 7/00* (2006.01)
*H04W 4/00* (2009.01)

(52) U.S. Cl.
CPC .................................... *H04W 4/008* (2013.01)

(58) Field of Classification Search
CPC ..................................................... H04W 4/008
USPC ........................................................ 455/41.2
See application file for complete search history.

(56) References Cited

U.S. PATENT DOCUMENTS

| | | | |
|---|---|---|---|
| 2008/0170591 A1* | 7/2008 | Kameyama | H04L 1/0041 370/476 |
| 2009/0199069 A1* | 8/2009 | Palanki | H04L 1/0065 714/755 |
| 2010/0142365 A1* | 6/2010 | Richardson | H04L 1/0045 370/210 |

* cited by examiner

*Primary Examiner* — April G Gonzales
(74) *Attorney, Agent, or Firm* — Bakerhostetler LLP

(57) ABSTRACT

Disclosed are a Bluetooth-based data transmission system and method, and an apparatus applied thereto. That is, when an original data is encoded and transmitted based on Bluetooth between a User Equipment (UE) and a beacon device, the encoded data is divided into partial data in consideration of a transmission data size and thus, various data may be transmitted irrespective of a transmission data size.

7 Claims, 4 Drawing Sheets

SYSTEM AND METHOD FOR TRANSMITTING DATA BASED ON BLUETOOTH, AND APPARATUS APPLIED TO THE SAME

CROSS-REFERENCE TO RELATED APPLICATION

This application claims a priority of the Korean Patent Application No. 10-2014-0027138 filed on Mar. 7, 2014, which is incorporated herein by reference in its entirety.

BACKGROUND OF THE INVENTION

1. Field of the Invention

The present invention relates to a method of dividing encoded data into a plurality of pieces of partial data for transmission, by taking into consideration a transmission data size, when original data is encoded into encoded data and the encoded data is transmitted based on Bluetooth between a User Equipment (UE) and a beacon device.

2. Description of the Prior Art

Bluetooth is a standard for wireless communication among devices in a short range with a low power, and is applied to various service fields.

The service fields where Bluetooth is currently applied include portable phones, clocks, sports, healthcare fields, sensors, device controlling, and the like. In particular, the example thereof may include an entry identification service that identifies the entry of a User Equipment (UE), and provides additional information to the identified UE.

In the case of the entry identification service, a UE connects to a beacon device in a shop, and data communication is executed based on Bluetooth between the UE and the beacon device, and thereby, the service is implemented.

However, Bluetooth is based on low-power wireless communication, and thus, a transmission data size that is allowed for each device is limited, which may be a hindrance to enlarging a service area through various data transmission.

SUMMARY OF THE INVENTION

The present invention has been made in order to solve the above-mentioned problems in the prior art and an aspect of the present invention is to provide a method of dividing encoded data into a plurality of pieces of partial data for transmission by taking into consideration a transmission data size, so as to transmit various data irrespective of the transmission data size, when original data is encoded into the encoded data and the encoded data is transmitted based on Bluetooth between a User Equipment (UE) and a beacon device.

According to a first aspect of the present invention in order to accomplish these objects, there is provided a User Equipment (UE). The UE includes: a checking unit configured to check a data size of original data when it is desired to encode the original data and to transmit the encoded data to a beacon device; a decision unit configured to decide additional data size, which is added to the data size of the original data as encoding is executed; and a transmitting unit configured to transmit the encoded data by dividing the encoded data into two or more pieces of partial data based on the decised additional data size, so that the beacon device combines the two or more pieces of partial data and generates the encoded data.

In particular, the UE further includes a determining unit configured to determine a transmission data size which is allowed for transmission to the beacon device, wherein the transmitting unit divides the encoded data to enable each of the two or more pieces of partial data to not exceed the transmission data size.

In particular, the transmission data size is determined based on a predetermined guaranteed transmission speed, and the determining unit determines, as the transmission data size, a maximum data size which guarantees the guaranteed transmission speed.

In particular, the UE further includes an encoding unit configured to encode the original data into the encoded data, and the encoding unit selects a encoding scheme from among two or more encoding schemes, based on the transmission data size, and encodes the original data into the encoded data based on the selected encoding scheme.

In particular, the two or more encoding schemes have different securities, which are related to the additional data size that is added to the data size of the original data.

According to a second aspect of the present invention in order to accomplish these objects, there is provided an operating method of a User Equipment (UE). The method includes: checking a data size of original data when it is desired to encode the original data into encoded data and to transmit the encoded data to a beacon device; deciding additional data size, which is added to the data size of the original data as the original data is encoded; and transmitting the encoded data to the beacon device by dividing the encoded data into two or more pieces of partial data based on the decided additional data size, so that the beacon device combines the two or more pieces of partial data and generates the encoded data.

In particular, the method further includes: determining a transmission data size that is allowed for transmission to the beacon, before the checking operation; and the transmitting operation divides the encoded data to enable the two or more pieces of partial data to not exceed the transmission data size, and transmits the same.

In particular, the transmission data size is determined based on a predetermined guaranteed transmission speed, and the determining operation determines a maximum data size which guarantees the guaranteed transmission speed.

In particular, the method further includes: encoding the original data into the encoded data, before the deciding operation, wherein the encoding operation comprises: selecting a encoding scheme from among two or more encoding schemes based on the transmission data size, and encoding the original data into the encoded data based on the selected encoding scheme.

In particular, the two or more encoding schemes have different securities, which are related to deciding an additional data size which is added to the data size of the original data.

According to a third aspect of the present invention in order to accomplish these objects, there is provided a recording medium storing a program. The recording medium implements operations including: checking a data size of original data when it is desired to encode the original data into encoded data and to transmit the encoded data to a beacon device; deciding an additional data size which is added to the data size of the original data as the original data is encoded; and transmitting the encoded data to the beacon device by dividing the encoded data into two or more pieces of partial data based on the decided additional data size, so that the beacon device combines the two or more pieces of partial data and generates the encoded data.

According to a Bluetooth-based data transmission system and method thereof, and an apparatus applied thereto of the present invention, when original data is encoded into encoded data and the encoded data is transmitted based on Bluetooth between a UE and a beacon device, the encoded data is divided into a plurality of pieces of partial data by taking into consideration a transmission data size and various data may be transmitted irrespective of the transmission data size and thus, various service scenarios based on Bluetooth may be designed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an embodiment of the present invention will be described with reference to the accompanying drawings.

Figure 1:
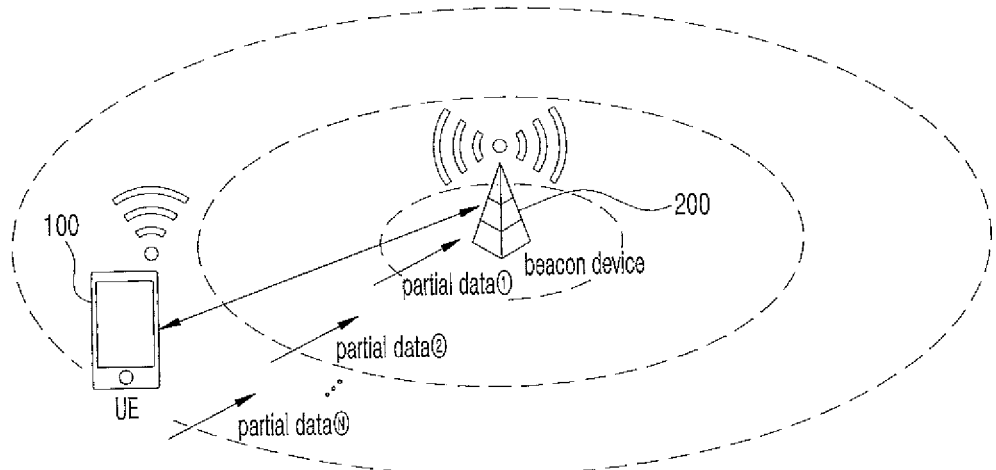
FIG. 1 is a schematic diagram illustrating a Bluetooth-based data transmission system according to an embodiment of the present invention.

FIG. 1 is a schematic diagram of a Bluetooth-based data transmission system according to an embodiment of the present invention;

As illustrated in FIG. 1, the Bluetooth-based data transmission system according to an embodiment of the present invention includes a User Equipment (UE) 100 and a beacon device 200 that executes transmission or reception of data with the UE 100 based on Bluetooth.

Here, the UE 100 is in a state of being connected to the beacon device 200, and the connection between the UE 100 and the beacon device 200 may be established through a series of paring procedures executed between the UE 100 that recognizes a beacon signal transmitted from the beacon device 200 and the beacon device 200.

The UE 100 refers to all mobile devices that may connect to the beacon device 200 so as to transmit or receive data based on Bluetooth.

For example, the UE 100 may correspond to a smart phone, a tablet Personal Computer (PC), a Personal Digital Assistant (PDA), and the like, and may not be limited thereto and include all devices that support Bluetooth.

Here, the UE 100 may contain an application for transmitting or receiving data based on Bluetooth, and may execute a series of operations associated with the data transmission and reception through the application.

The beacon device 200 may indicate, for example, a device that is located in an offline shop and is capable of executing data communication with the UE 100 based on Bluetooth.

Here, a Bluetooth Low Energy (BLE) scheme which is low energy scheme of Bluetooth v4.0 may be used as a Bluetooth standard employed by the beacon device 200.

According to the BLE scheme, a data transmission speed is, for example, 1 Mbps, and a transmission data size allowed for a single transmission is 20 kbytes.

According to an embodiment of the present invention, data communication between the UE 100 and the beacon device 200 may be executed.

However, Bluetooth is based on the low power wireless communication and thus, the transmission data size allowed for each device is limited.

In particular, the BLE scheme, which is used as the Bluetooth standard in an embodiment of the present invention, employs the low energy scheme and thus, the transmission datasize allowed for a single transmission is 20 kbytes, which is significantly limited.

As described above, when the transmission data size is limited, types of transmittable data may be limited, which means that a service field to which Bluetooth is applied is also limited.

In addition, the data transmitted between the UE 100 and the beacon device 200 requires encoding for security. When original data is encoded, the data size increases and thus, the limitation on the above described transmission data size may increase.

As described above, in a case of the Bluetooth-based data communication, the limitation on the transmission data size may be a huge hindrance to enlarging a service area through various data transmission and thus, there is a desire for a method of overcoming the above drawback.

Accordingly, an embodiment of the present invention provides a method of overcoming the limitation on the transmission data size for the Bluetooth-based data communication, and hereinafter, detailed descriptions thereof will be provided.

According to an embodiment of the present invention, both the UE 100 and the beacon device 200 execute transmission and reception of data with respect to one another. The UE 100 and the beacon device 200 have an identical configuration and operation characteristics associated with the data transmission or reception. Accordingly, for ease of description, it is assumed that the UE 100 transmits data and the beacon device 200 receives the same.

First, the UE 100 executes a function of determining a transmission data size.

In particular, the UE 100 determines the transmission data size, which is a data size allowed for a single transmission to the beacon device 200.

The transmission data size is determined based on a guaranteed transmission speed, which needs to be guaranteed when the UE 100 transmits data to the beacon device 200.

Also, the UE 100 executes a function of checking a data size of original data.

In particular, the UE 100 transmits encoded data by encoding the original data desired to be transmitted to the effect of data security when the UE 100 transmits data to the beacon device 200. Before the encoding process, a data size of the original data is preferentially checked.

The data size of the original data is preferentially checked as described above, so as to preferentially check whether the data size of the original data exceeds the transmission data size that is allowed for a single transmission to the beacon device 200.

Also, the UE 100 executes a function of encoding the original data.

In particular, the UE 100 selects one of a plurality of encoding schemes before encoding the original data into encoded data and transmitting the same. In this instance, when the original data is encoded, an encoding scheme may be selected to enable an additional data size of the original data to not exceed the determined transmission data size. When the additional data size already exceeds the determined transmission data size, an encoding scheme may be selected that may minimize the excess.

Here, when the plurality of encoding schemes have different securities based on a type of encoding scheme, as the security becomes higher, an additional data size added to the data size of the original data becomes higher.

As a matter of course, when a high security is required by the selection of the user, an encoding scheme having the highest security may be selected, irrespective of the additional data size.

In addition, when an encoding scheme is selected through the above described method, the UE 100 encodes the original data through the selected encoding scheme, so as to generate encoded data.

In addition, the UE 100 executes a function of deciding an additional data size.

In particular, when the original data is completely encoded, the UE 100 decides the additional data size, which is a data size that is actually added when the original data is encoded to the encoded data.

The decided additional data size may be utilized as information which is a reference for dividing the encoded data into partial data.

In addition, the UE 100 executes a function of dividing the encoded.

In particular, the UE 100 divides the encoded data into a plurality of pieces of partial data when the additional data size is decided.

In this instance, the UE 100 divides the encoded data to enable each piece of partial data to not exceed the determined transmission data size.

In addition, the UE 100 executes a function of transmitting the partial data.

In particular, when the encoded data is divided into the plurality of pieces of partial data, the UE 100 sequentially transmits the plurality of pieces of partial data to the beacon device 200.

In this instance, the UE 100 transmits the partial data by inserting, into a header of the partial data, sequence information which is associated with an order of division, so that the beacon device 200 that receives the partial data, combines the partial data based on the sequence information, and restores the encoded data.

In addition, the UE 100 transmits the partial data by inserting, into the header of the partial data, information associated with an encoding scheme in addition to the sequence information, so that the beacon device 200 that recognizes the same, decodes the restored encoded data to the original data based on the recognized encoding scheme.

The beacon device 200 executes a function of combining the partial data.

In particular, when the partial data is completely received from the UE 100, the beacon device 200 combines the received partial data based on the sequence information inserted into the header of the partial data, so as to restore the encoded data.

Here, the completion of the reception of the partial data may be determined through termination information (End of Message (EOM)) inserted into the header of the last partial data.

Also, when the encoded data is completely restored, the beacon device 200 decodes the encoded data into the original data based on a decoding scheme appropriate for the encoding scheme recognized from the header of the partial data.

Figure 2:
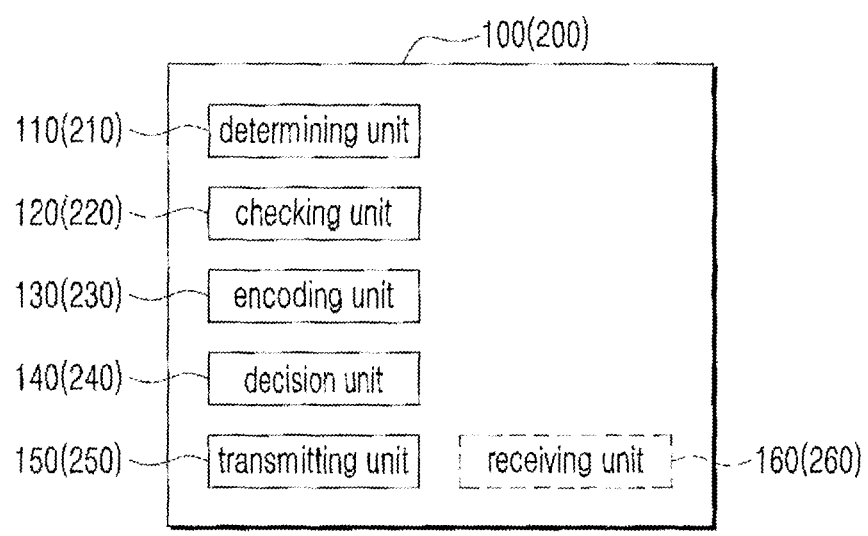
FIG. 2 is a schematic diagram illustrating a User Equipment (UE) (or beacon device) according to an embodiment of the present invention.

Hereinafter, the configurations of the UE 100 and the beacon device 200 according to an embodiment of the present invention will be described in detail with reference to FIG. 2.

The configurations and operational characteristics of the UE 100 and the beacon device 200 are identical, and hereinafter, the UE 100 will be exemplified.

That is, the UE 100 according to an embodiment of the present invention includes a determining unit 110 configured to determine a transmission data size, a checking unit 120 configured to check a data size of original data, an encoding unit 130 configured to encode original data, a decision unit 140 configured to decide an additional data size, and a transmitting unit 150 configured to transmit encoded data by dividing the encoded data into partial data.

In addition, the UE 100 according to an embodiment of the present invention may further include a receiving unit 160 configured to receive partial data transmitted from the beacon device 200.

Here, the entirety or at least a part of the described configuration of the UE 100 including the described determining unit 110, the checking unit 120, the encoding unit 130, the decision unit 140, and the transmitting unit 150 may be embodied as a software module implemented by an application or may be embodied as a combination of a software module and hardware.

First, the determining unit 110 executes a function of determining a transmission data size.

In particular, the determining unit 110 determines the transmission data size, which is a data size allowed for a single transmission to the beacon device 200.

In this instance, the determining unit 110 determines the transmission data size based on a guaranteed transmission speed, which needs to be guaranteed when the UE 100 transmits data to the beacon device 200.

For example, in an embodiment of the present invention, Bluetooth Low Energy (BLE) is employed as the Bluetooth standard. Accordingly, an allowed data transmission speed is 1 Mbps, and a guaranteed transmission speed which needs to be guaranteed may be set to 0.8 Mbps, which is lower than 1 Mbps.

In addition, according to BLE, a transmission data size allowed for a single transmission is 20 kbytes. To guarantee the set guaranteed transmission speed, the transmission data size may be determined to be 18 kbytes, which is lower than 20 kbytes.

In addition, the checking unit 120 executes a function of checking a data size of original data.

In particular, the checking unit 120 transmits encoded data by encoding the original data desired to be transmitted to the effect of data security when transmitting data to the beacon device 200. Before the encoding process, the data size of the original data is preferentially checked.

The data size of the original data is preferentially checked so as to preferentially check whether the data size of the original data exceeds the transmission data size that is allowed for a single transmission to the beacon device 200.

The encoding unit 130 executes a function of encoding the original data.

In particular, the encoding unit 130 selects one of a plurality of encoding schemes before encoding the original data into encoded data for transmission. In this instance, when the original data is encoded, an encoding scheme may be selected to enable an additional data size of the original data to not exceed the determined transmission data size. When the additional data size already exceeds the determined transmission data size, an encoding scheme may be selected that may minimize the excess.

Here, the types of the plurality of encoding schemes may be classified based on the security of encoded data, and the types include, for example, a public key encoding scheme such as Rivest, Shamir, Aslemen (RSA) and Digital Signature Algorithm (DSA), a symmetric key encoding scheme such as Data Encryption Standard (DES) and Advanced Encryption Standard (AES), and the like.

Here, when the plurality of encoding schemes have different securities based on a type of encoding scheme, as the security becomes higher, an additional data size added to the data size of the original data becomes higher.

As a matter of course, when a high security is required by the selection of the user, an encoding scheme having the highest security may be selected, irrespective of the additional data size.

In addition, when an encoding scheme is selected through the above described method, the encoding unit 130 encodes the original data through the selected encoding scheme, so as to generate the encoded data.

In addition, the decision unit 140 executes a function of deciding a transmission data size.

In particular, when the original data is completely encoded, the decision unit 140 decides the additional data size, which is a data size that is actually added when the original data is encoded to the encoded data.

As described above, the additional data size is decided so that the transmitting unit 150 utilizes the decided additional data size as information that is a reference for dividing the encoded data into partial data.

In addition, the transmitting unit 150 executes a function of dividing the encoded data.

In particular, the transmitting unit 150 divides the encoded data into a plurality of pieces of partial data when the additional data size is decided.

In this instance, the transmitting unit 150 divides the encoded data to enable each piece of partial data to not exceed the determined transmission data size.

In addition, the transmitting unit 150 executes a function of transmitting the partial data.

In particular, when the encoded data is divided into the plurality of pieces of partial data, the transmitting unit 150 sequentially transmits the plurality of pieces of partial data to the beacon device 200.

In this instance, the transmitting unit 150 transmits the partial data by inserting, into a header of the partial data, sequence information which is associated with an order of division, so that the beacon device 200 that receives the partial data, combines the partial data based on the sequence information, and restores the encoded data.

In addition, the transmitting unit 150 transmits the partial data by inserting, into the header of the partial data, information associated with an encoding scheme in addition to the sequence information, so that the beacon device 200 that recognizes the same, decodes the restored encoded data to the original data based on the recognized encoding scheme.

The receiving unit 160 executes a function of combining the partial data.

In particular, when partial data divided from the encoded data is received from the beacon device 200, the receiving unit 160 completes the reception of the partial data, and combines the received partial data based on the sequence information inserted into the header of the partial data, so as to restore the encoded data.

Here, the completion of the reception of the partial data may be determined through termination information (End of Message (EOM)) inserted into the header of the last partial data.

Also, when the encoded data is completely restored, the receiving unit 160 decodes the encoded data into the original data based on a decoding scheme appropriate for the encoding scheme recognized from the header of the partial data.

As described above, according to a Bluetooth-based data transmission system according to an embodiment of the present invention, when original data is encoded into encoded data and the encoded data is transmitted based on Bluetooth between the UE 100 and the beacon device 200, the encoded data is divided into partial data and is transmitted in consideration of a transmission data size. Accordingly, various types of data transmission may be possible irrespectively of the transmission data size and thus, various service scenarios based on the Bluetooth may be possible.

Figure 3:
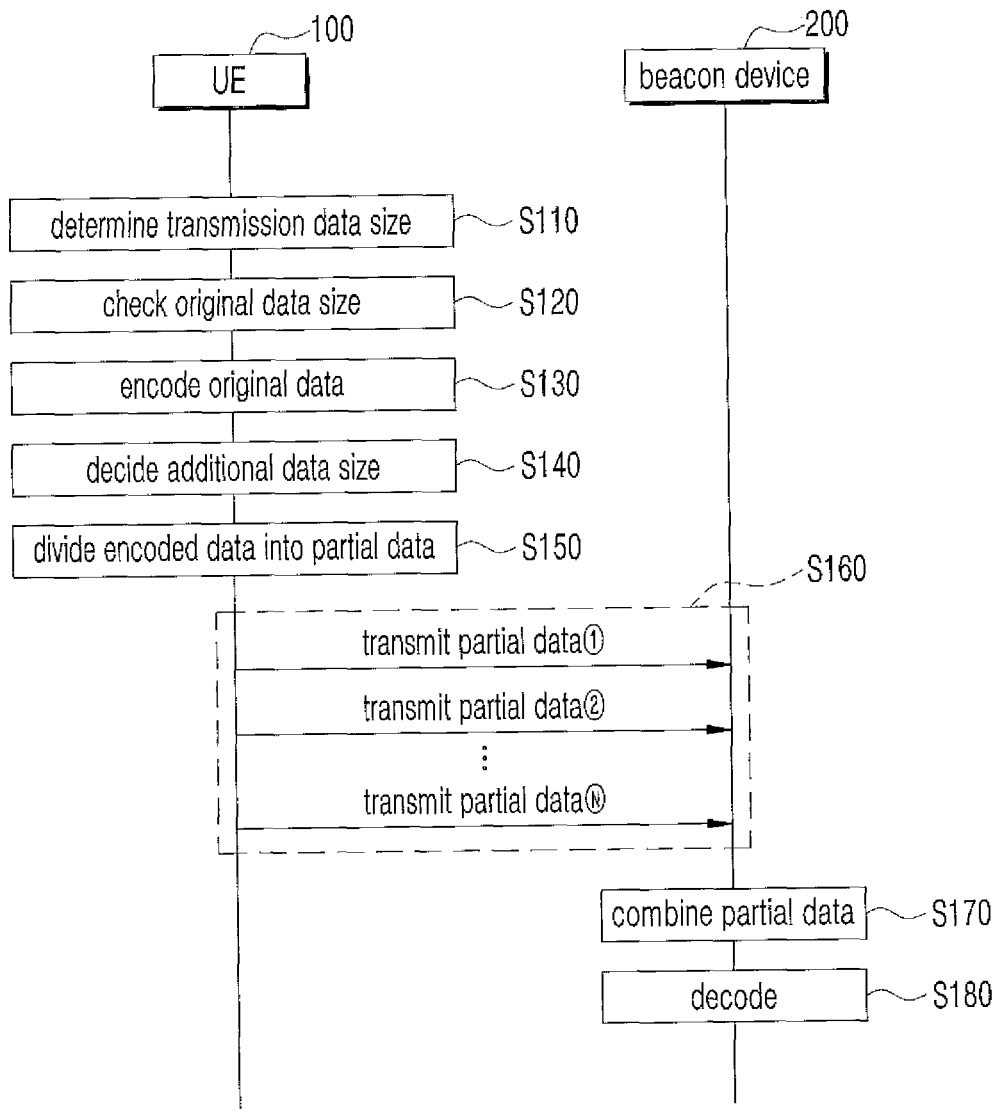
FIG. 3 is a schematic flowchart illustrating operations in a Bluetooth-based data transmission system according to an embodiment of the present invention.
Figure 4:
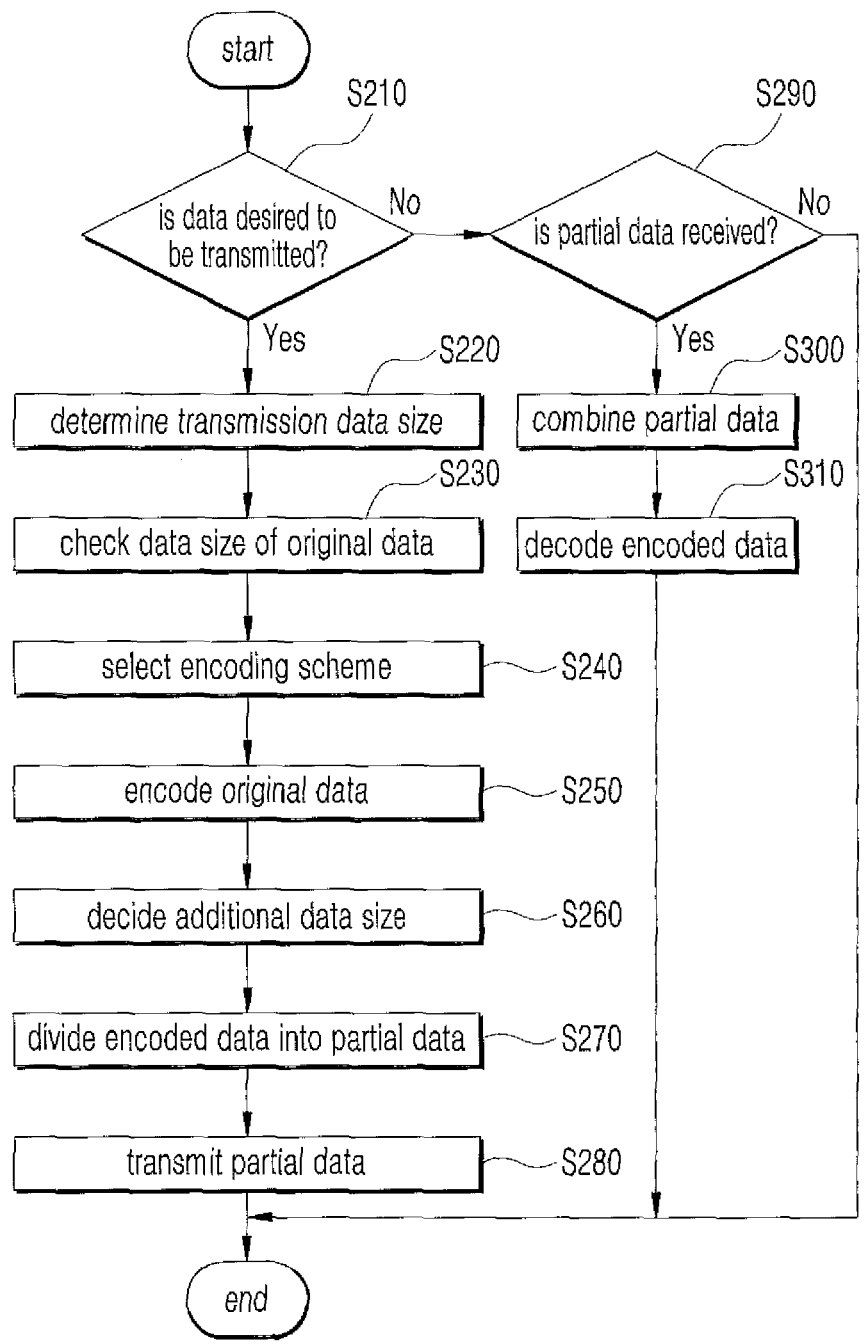
FIG. 4 is a schematic flowchart illustrating operations in a DE (or beacon device) according to an embodiment of the present invention.

Hereinafter, a Bluetooth-based data transmission method according to an embodiment of the present invention will be described with reference to FIGS. 3 and 4. Here, for ease of description, the configurations of FIGS. 1 and 2 will be described with corresponding reference numerals.

First, an operational flow in the Bluetooth-based data transmission system according to an embodiment of the present invention will be described with reference to FIG. 3.

The UE 100 determines a transmission data size which is a data size allowed for a single transmission to the beacon device 200, in operation S110.

In this instance, the UE 100 determines the transmission data size based on a guaranteed transmission speed, which needs to be guaranteed when the UE 100 transmits data to the beacon device 200.

The UE 100 transmits encoded data by encoding the original data desired to be transmitted to the effect of data security when transmitting data to the beacon device 200. Before the encoding process, the UE 100 preferentially checks the data size of the original data, in operation S120.

The UE 100 selects one of a plurality of encoding schemes before encoding the original data into encoded data for transmission. In this instance, when the original data is encoded, an encoding scheme may be selected to enable an additional data size of the original data to not exceed the determined transmission data size. When the additional data size already exceeds the determined transmission data size, an encoding scheme may be selected that may minimize the excess, in operation S130.

When the original data is completely encoded, the UE 100 decides an additional data size which is a data size actually added when the original data is encoded into the encoded data, in operation S140.

When the additional data size is decided, the encoded data is divided into a plurality of pieces of partial data, in operation S150.

In this instance, the UE 100 divides the encoded data to enable each piece of partial data to not exceed the determined transmission data size.

When the encoded data is divided into partial data, the UE 100 sequentially transmits the partial data to the beacon device 200, in operation S160.

In this instance, the UE 100 transmits the partial data by inserting, into a header of the partial data, sequence information which is associated with an order of division, so that the beacon device 200 that receives the partial data, combines the partial data based on the sequence information, and restores the encoded data.

In addition, the UE 100 transmits the partial data by inserting, into the header of the partial data, information associated with an encoding scheme in addition to the sequence information, so that the beacon device 200 that recognizes the same, decodes the restored encoded data to the original data based on the recognized encoding scheme.

In addition, when the partial data is completely received from the UE 100, the beacon device 200 combines the received partial data with reference to the sequence information inserted into the header of the partial data so as to restore the encoded data, in operation S170.

When the encoded data is completely restored, the beacon device 200 decodes the encoded data into the original data based on a decoding scheme appropriate for the encoding scheme recognized from the header of the partial data, in operation S180.

Hereinafter, operations of the beacon device 200 according to an embodiment of the present invention will be described in detail with reference to FIG. 4.

First, when it is desired to encode original data and to transmit the encoded data to the beacon device 200, the determining unit 110 determines a transmission data size, which is a data size allowed for a single transmission to the beacon device 200, in operations S210 and S220.

In this instance, the determining unit 110 determines the transmission data size based on a guaranteed transmission speed, which needs to be guaranteed when the UE 100 transmits data to the beacon device 200.

The checking unit 120 transmits encoded data by encoding the original data desired to be transmitted to the effect of data security when transmitting data to the beacon device 200. Before the encoding process, the checking unit 120 preferentially checks a data size of the original data, in operation S230.

The data size of the original data is preferentially checked as described above, so as to preferentially check whether the data size of the original data exceeds the transmission data size that is allowed for a single transmission to the beacon device 200.

Subsequently, the encoding unit 130 selects one of a plurality of encoding schemes before encoding the original data into the encoded data for transmission. In this instance, when the original data is encoded, an encoding scheme may be selected to enable an additional data size of the original data to not exceed the determined transmission data size. When the additional data size already exceeds the determined transmission data size, an encoding scheme may be selected that may minimize the excess, in operation S240.

Here, when the plurality of encoding schemes have different securities based on a type of encoding scheme, as the security becomes higher, an additional data size added to the data size of the original data becomes higher.

As a matter of course, when a high security is required by the selection of the user, an encoding scheme having the highest security may be selected, irrespective of the additional data size.

Subsequently, when an encoding scheme is selected through the above described method, the encoding unit 130 encodes the original data through the selected encoding scheme, so as to generate the encoded data, in operation S250.

When the original data is completely encoded, the decision unit 140 decides an additional data size which is a data size actually added when the original data is encoded into the encoded data, in operation S260.

When the additional data size is decided, the transmitting unit 150 divides the encoded data into a plurality of pieces of partial data, in operation S270.

In this instance, the transmitting unit 150 divides the encoded data to enable each piece of partial data to not exceed the determined transmission data size.

When the encoded data is divided into the plurality of pieces of partial data, the transmitting unit 150 sequentially transmits the plurality of pieces of partial data to the beacon device 200.

In this instance, the transmitting unit 150 transmits the partial data by inserting, into a header of the partial data, sequence information which is associated with an order of division, so that the beacon device 200 that receives the partial data, combines the partial data based on the sequence information, and restores the encoded data.

In addition, the transmitting unit 150 transmits the partial data by inserting, into the header of the partial data, information associated with an encoding scheme in addition to the sequence information, so that the beacon device 200 that recognizes the same, decodes the restored encoded data to the original data based on the recognized encoding scheme.

When partial data divided from the encoded data is received from the beacon device 200 in operation S210, the receiving unit 160 completes the reception of the partial data, and combines the received partial data based on the sequence information inserted into the header of the partial data, so as to restore the encoded data, in operation S300.

In this instance, the completion of the reception of the partial data may be determined through termination information (End of Message (EOM)) inserted into the header of the last partial data.

When the encoded data is completely restored, the receiving unit 160 decodes the encoded data into the original data based on a decoding scheme appropriate for the encoding scheme recognized from the header of the partial data, in operation S310.

As described above, according to a Bluetooth-based data transmission method according to an embodiment of the present invention, when original data is encoded into encoded data and the encoded data is transmitted based on Bluetooth between the UE 100 and the beacon device 200, the encoded data is divided into partial data and is transmitted in consideration of a transmission data size. Accordingly, various types of data transmission may be possible irrespectively of the transmission data size and thus, various service scenarios based on the Bluetooth may be possible.

Functional operations and subject embodiments described in the present specifications are embodied through a digital electronic circuit, or computer software, firmware, or hardware including a structure disclosure in the present specifications and structural equivalents thereof, or a combination thereof. The subject embodiments described in the present specifications may be embodied as one or more computer program products, in other words, one or more modules associated with a computer program command encoded on a tangible program storage medium for controlling operations of a processing system or for execution trough the same.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

As described above, the present specifications may not limit the present invention to the described specific terminologies. Therefore, although the present invention has been described with reference to the described examples, those skilled in the field may reconstruct, change, and modify the examples, without departing from the scope of the present invention. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

INDUSTRIAL APPLICABILITY

According to the Bluetooth-based data transmission system and method, and an apparatus applied thereto, of the present invention, when original data is encoded and the encoded data is transmitted based on Bluetooth between a UE and a beacon device, the encoded data is divided into partial data for transmission in consideration of a transmission data size. Accordingly, the present invention is beyond the limitation of an existing technology and thus, the use of the related technologies and marketing and sales of apparatuses thereof have great potential, and the present invention is realistically and clearly operable. Therefore, the invention has industrial applicability.

What is claimed is:

1. A User Equipment (UE), comprising:
  a checking unit configured to check a data size of original data when it is desired to encode the original data and to transmit the encoded data to a beacon device;
  a determining unit configured to determine a transmission data size which is allowed for transmission to the beacon device,
  an encoding unit configured to encode the original data into encoded data,
  wherein the encoding unit selects an encoding scheme from among two or more encoding schemes, based on the transmission data size, and encodes the original data into the encoded data based on the selected encoding scheme;
  a decision unit configured to decide an additional data size, which is added to the data size of the original data as encoding is executed; and
  a transmitting unit configured to transmit the encoded data by dividing the encoded data into two or more pieces of partial data based on the decided additional data size, so that each of the two or more pieces of partial data do not exceed the transmission data size and such that the beacon device combines the two or more pieces of partial data and generates the encoded data.

2. The UE of claim 1, wherein the transmission data size is determined based on a predetermined guaranteed transmission speed, and
  the determining unit determines, as the transmission data size, a maximum data size which guarantees the guaranteed transmission speed.

3. The UE of claim 1, wherein the two or more encoding schemes have different securities, which are related to deciding an additional data size that is added to the data size of the original data.

4. An operating method of a User Equipment (UE), the method comprising:
   checking a data size of original data when it is desired to encode the original data into encoded data and to transmit the encoded data to a beacon device;
   wherein the encoding operation comprises:
   selecting a encoding scheme from among two or more encoding schemes based on the transmission data size, and encoding the original data into the encoded data based on the selected encoding scheme;
   determining a transmission data size that is allowed for transmission to the beacon, before the checking operation,
   deciding an additional data size, which is added to the data size of the original data as the original data is encoded; and
   transmitting the encoded data to the beacon device by dividing the encoded data into two or more pieces of partial data based on the decided additional data size, so that each of the two or more pieces of partial data do not exceed the transmission data size and such that the beacon device combines the two or more pieces of partial data and generates the encoded data.

5. The method of claim 4, wherein the transmission data size is determined based on a predetermined guaranteed transmission speed, and
   the determining operation determines, as the transmission data size, a maximum data size which guarantees the guaranteed transmission speed.

6. The method of claim 4, wherein the two or more encoding schemes have different securities, which are related to deciding an additional data size which is added to the data size of the original data.

7. A non-transitory computer readable storage medium storing a program implementing operations comprising:
   checking a data size of original data when it is desired to encode the original data into encoded data and to transmit the encoded data to a beacon device;
   determining the transmission data size which is allowed for transmission to the beacon device before the checking operation,
   deciding an additional data size which is added to the data size of the original data as the original data is encoded; and
   transmitting the encoded data to the beacon device by dividing the encoded data into two or more pieces of partial data based on the decided additional data size, so that each of the two or more pieces of partial data do not exceed the transmission data size and such that the beacon device combines the two or more pieces of partial data and generates the encoded data.

* * * * *